C. D. BACKUS.
SPRING WHEEL.
APPLICATION FILED FEB. 23, 1915.
1,162,545.
Patented Nov. 30, 1915.
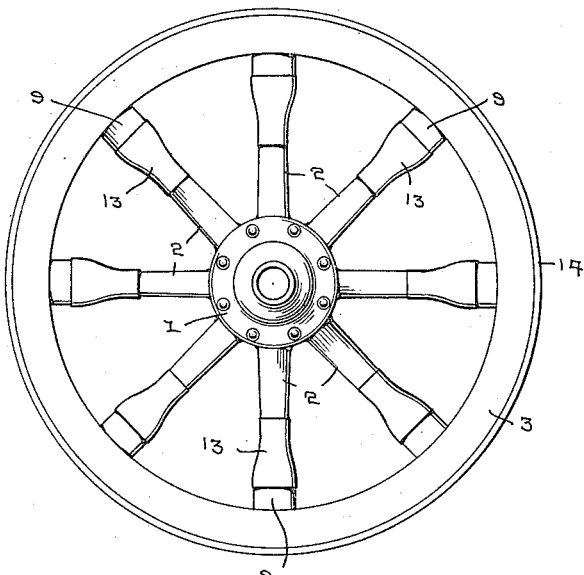
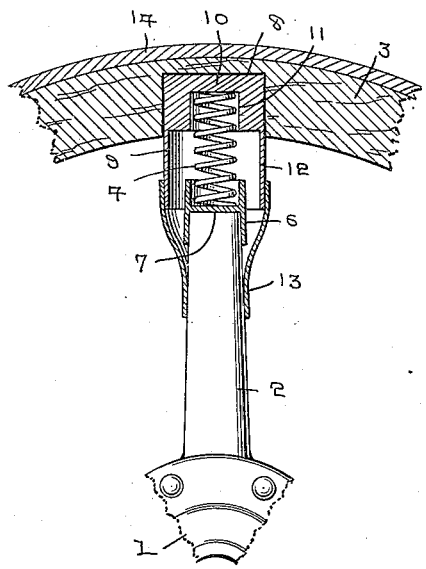
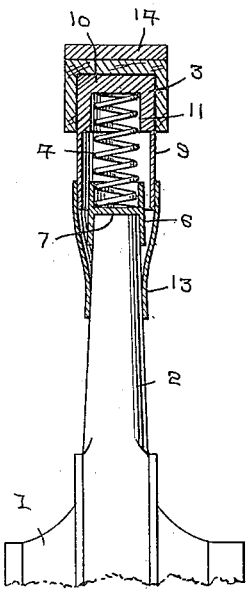
Inventor
C. D. Backus
Witnesses

UNITED STATES PATENT OFFICE.

CORNELIUS D. BACKUS, OF BELVA, WEST VIRGINIA.

SPRING-WHEEL.

1,162,545.  Specification of Letters Patent.  Patented Nov. 30, 1915.

Application filed February 23, 1915. Serial No. 10,035.

*To all whom it may concern:*

Be it known that I, CORNELIUS D. BACKUS, a citizen of the United States, residing at Belva, in the county of Nicholas and State of West Virginia, have invented certain new and useful Improvements in Spring-Wheels; and I do hereby declare the following to be a full, clear, and exact description of the invention, such as will enable others skilled in the art to which it appertains to make and use the same.

My invention relates to new and useful improvements in wheel construction and more particularly to that class adapted to be used in connection with vehicles such as automobiles and the like, and my object is to provide resilient connecting means between the spokes of the wheel and the felly thereof.

A further object is to provide a suitable thimble for the reception of one end of the resilient means and the end of the spoke. And a further object is to provide means in connection with the felly for the reception of the opposite end of the resilient means. And a further object is to provide means for preventing dirt, grit and the like from coming in contact with the resilient means.

Other objects and advantages will be hereinafter more particularly pointed out in the accompanying specification.

In the accompanying drawings, which are made a part of this application, Figure 1 is a side elevation of a wheel showing my improved resilient features attached thereto, Fig. 2 is a sectional view longitudinally of the felly and vertically through the housing for the resilient means, and Fig. 3 is a transverse vertical sectional view through the felly of the wheel and the housing for the resilient means.

Referring to the drawings, in which similar reference numerals designate corresponding parts throughout the several views, 1 indicates the hub of the wheel which may be constructed in any preferred manner, and 2 the spokes carried thereby, and 3 indicates the felly such as is commonly attached to wheel structures.

Instead of connecting the spokes directly to the felly whereby a rigid wheel construction would be provided, the ends of the spokes are positioned a distance from the felly and are connected thereto by means of springs 4, which springs are preferably coiled, and in order to hold the ends of the springs in engagement with the ends of the spokes, a thimble 6 is provided, said thimble having a transverse partition 7 at a point adjacent its longitudinal center, the spoke 2 entering one end of the thimble and resting against the partition, while one end of the spring 4 enters the opposite end of the thimble and rests upon said partition, and in order to prevent the spring from casual disengagement with the thimble, the end entering the thimble is preferably fixed to the partition, as by means of brazing or soldering.

Seated in a cavity 8 formed in the felly 3 is a housing 9, the base 10 thereof having a seat 11 formed therein for the reception of one end of the spring 4, said seat being but slightly larger in diameter than the diameter of the spring.

The base 10 is formed of solid metal with the exception of the seat 11 to a point adjacent the free edge of the felly, while the wall 12 of the housing is of shell-like formation, thus providing sufficient space for yielding movement of the end of the spoke and the spring within the housing, and as the movement of the spoke is with the line of travel of the wheel, the housing 9 is preferably formed oval shaped in cross section, thus disposing the end walls of the housing a distance beyond each side of the spoke, while the side walls are adjacent the face of the spoke to prevent lateral movement of the spokes.

The wall 12 of the housing extends around a portion of the thimble 6 and terminates at a point substantially in line with the end of the spoke and in order to prevent dirt, water, grit and the like from entering the housing, and coming in contact with the spring, a flexible shield 13 is slipped over the end of the spoke 2 and this end is reduced in size so as to tightly fit around the spoke, while the opposite end thereof is constructed of larger dimension and tightly fits around the open end of the housing, and in view of the flexibility of the shield, the spoke may move back and forth in the housing without disconnecting the shield from the housing. The ends of the shield 13 engaging the spoke and housing respectively are constructed of less diameter than said parts so that it will be necessary to stretch the ends of the flexible material in order to introduce them over the spoke and shield, the contraction of the flexible material securely holding the ends in engagement with their respective parts without employing additional securing means.

The springs are introduced between the felly and ends of the spokes under tension so that the hub will be normally held at the axial center of the wheel but will yield sufficiently to eliminate the jar as when the tire 14 of the wheel strikes an object, and prevent the force of the jar from being directed against the axle of the vehicle. It will be understood that any suitable form of tire may be employed in connection with the wheel or that the felly and tire could be formed of metal and the housing formed integrally with the felly.

In view of the simplicity of this device, it can be very cheaply constructed and readily assembled together, and by placing the springs under tension, the hub will be normally carried at the axial center of the wheel and it will likewise be seen that the resilient portion of the wheel can be attached to the spokes and fellies of the ordinary wheel by shortening the spokes and providing a cavity in the felly for the reception of the housing.

What I claim is:

In a wheel construction, the combination with the spokes of the wheel and a felly having a cavity therein, of a substantially oval shaped housing having one end seated in said cavity, a seat in the housing, a thimble having a partition substantially at its longitudinal center, one end of the thimble being adapted to receive the end of the spoke, a spring having one of its ends engaging the opposite end of the thimble and the opposite end engaging the seat in the housing, and a flexible shield having one of its ends surrounding the spoke and the opposite end surrounding the open end of the housing, said spring being normally under tension.

In testimony whereof I have signed my name to this specification in the presence of two subscribing witnesses.

CORNELIUS D. BACKUS.

Witnesses:
GROVER MARTIN,
M. J. DARLINGTON.

Copies of this patent may be obtained for five cents each, by addressing the "Commissioner of Patents, Washington, D. C."